United States Patent [19]

Blaner

[11] Patent Number: 4,862,461
[45] Date of Patent: Aug. 29, 1989

[54] PACKET SWITCH NETWORK PROTOCOL

[75] Inventor: Bartholomew Blaner, Newark Valley, N.Y.

[73] Assignee: International Business Machines Corp., Armonk, N.Y.

[21] Appl. No.: 2,351

[22] Filed: Jan. 12, 1987

[51] Int. Cl.[4] .......................................... G08C 25/02
[52] U.S. Cl. ...................................................... 371/33
[58] Field of Search .................................. 371/32, 33

[56] References Cited

U.S. PATENT DOCUMENTS

| | | | |
|---|---|---|---|
| 3,534,330 | 10/1970 | Haller et al. | 371/32 |
| 3,754,211 | 8/1973 | Rocher et al. | 371/33 |
| 3,956,589 | 5/1976 | Weathers et al. | 371/32 X |
| 4,074,232 | 2/1978 | Otomo et al. | 371/32 X |
| 4,092,630 | 5/1978 | van Duuren et al. | 371/32 |
| 4,149,142 | 4/1979 | Kageyama et al. | 371/32 |
| 4,304,001 | 12/1981 | Cope | 371/8 |
| 4,332,027 | 5/1982 | Malcolm et al. | 371/33 X |
| 4,422,171 | 12/1983 | Wortley et al. | 371/32 |
| 4,586,086 | 4/1986 | Ohzeki | 371/33 |
| 4,745,593 | 5/1988 | Stewart | 371/33 X |

Primary Examiner—Charles E. Atkinson
Attorney, Agent, or Firm—Pollock, Vande Sande & Priddy

[57] ABSTRACT

A first of a plurality of nodes in a multiprocessor system transmits a data packet to a second of the plurality of nodes over a data channel when the first node detects a predetermined sequence of bits on a control channel connected therebetween. The data packet is preceded on the data channel by a header which includes a plurality of fields informing the second node of the beginning of the data packet, the length of the data packet and the sequence number assigned to the packet. The data packet is followed by a field which enables the second node to determine whether the data packet was received correctly. If the second node determines that the data packet was received correctly, the data packet is stored in the node and an acknowledgment sequence is transmitted to the first node over the control channel. However, if an error occurs during the transmission of the data packet, the protocol enters an error state by removing all signal information from the data and control channels. Thereafter, a recovery processor, which is associated with each of the plurality of nodes, analyzes the state of the nodes at the time of the error in order to determine which corrective action needed to recover the respective node. The data link protocol also facilitates the transmission of a data packet from a first node through an intermediate node to a final node without storing the data packet in the intermediate node.

3 Claims, 9 Drawing Sheets

PACKET SWITCH NETWORK PROTOCOL

BACKGROUND OF THE INVENTION

1. Field of the Invention

This invention relates to multiprocessor systems and more particularly to a data link protocol for transmitting data packets between nodes in a multiprocessor system.

2. Background Information

Closely-coupled multiprocessor systems require high performance from the underlying communication network. It is not unusual to expect a constant level of performance from the communication network as the load generated by a plurality of attached processors within the system peaks. Traditionally, this demand has been met with backplane networks composed of buses of parallel wires controlled by high speed hardware units. While this interconnection methodology facilitates communication of parallel data at very high speeds, it is inherently unreliable because of the large number of wires and connectors involved in such a network. Moreover, the buses introduce crosstalk noise, signal skew and signal level shifting into the system which degrade its integrity and reliability. Additionally, the bus connectors introduce substantial reliability problems as a result of poor mechanical contacts between the bus and the connection target. These problems are increased by the repeated insertion and removal of connectors and movement of the system.

Alternately, the use of long haul networks have proven to be highly reliable. In long haul networks, a data link, such as a wire or optical fiber, which interconnects the communicating systems, facilitates the serial transmission of data packets from one system to another system. Long haul networks generally are characterized by fewer wires or fibers which actually connect the communicating systems, the feasibility of shielding wires to minimize crosstalk noise, reliable serial connectors and the use of sophisticated protocols which facilitate error detection and recovery on serial data links. Conceptually, backplane networks modeled after long haul networks would be an attractive solution to the reliability problem. Unfortunately, the model fails to provide the performance required by closely-coupled systems. Similarly, local area networks, which are capable of comparatively high speed data transmission over short distances, fail to provide the required performance. Local area networks and long haul networks perform the major portion of data transmission or network function with software which is resident in each of a plurality of communicating processors or host. This transmission methodology while adding flexibility to the system severely degrades the effective data transmission rate.

OBJECTS OF THE INVENTION

Therefore it is an object of the invention to provide an improved method of transmitting data packets within a multiprocessor system.

It is another object of the invention to provide a method of transmitting a data packet from a sending node to a receiving node only when the receiving node is available.

It is still another object of the invention to detect and correct errors during the transmission of data packets.

It is a further object of the invention to provide a method of transmitting a data packet from a first node through a second node to a third node without storing the data packet in the second node.

SUMMARY OF THE INVENTION

In accordance with these objects, features and advantages of the invention are accomplished by an asynchronous data link protocol described herein. A first of a plurality of nodes in a multiprocessor system transmits a data packet to a second of the plurality of nodes over a data channel when the first node detects a predetermined sequence of bits on a control channel connected therebetween. The data packet is preceded on the data channel by a header which includes a plurality of fields informing the second node of the beginning of the data packet, the length of the data packet and the sequence number assigned to the packet. The data packet is followed by a field which enables the second node to determine whether the data packet was received correctly. If the second node determines that the data packet was received correctly, the data packet is stored in the node and an acknowledgment sequence is transmitted to the first node over the control channel. However, if an error occurs during the transmission of the data packet, the protocol enters an error state by removing all signal information from the data and control channels. Thereafter, a recovery processor, which is associated with each of the plurality of nodes, analyzes the state of the nodes at the time of the error in order to determine which corrective action needed to recover the respective node.

The data link protocol also facilitates the transmission of a data packet from a first node through intermediate nodes to a final node without storing the data packet in the intermediate node. This process is referred to as virtual cut-through. The first node transmits the data packet to the intermediate node when it detects the predetermined sequence of bits on the control channel connected therebetween. If the intermediate node is able to immediately transmit he data packet to its destination node, it does so over a data channel connected between the second node and the final node without storing the packet in the second node. If an error is detected by the second node, the protocol enters the error state and informs the final node to discard the data packet. Recovery processors associated with the various nodes attempt to recovery the respective nodes by retransmitting the data packet by the first node until the packet is received correctly. If an error is detected by the final node, the recovery processors associated with the intermediate and the final nodes attempt recovery by causing a retransmission of the data packet by the intermediate node until the packet is received correctly.

BRIEF DESCRIPTION OF THE DRAWINGS

This invention will be described in greater detail by referring to the accompanying drawings and the description of the best mode that follows.

DESCRIPTION OF THE BEST MODE FOR CARRYING OUT THE INVENTION

Figure 1:
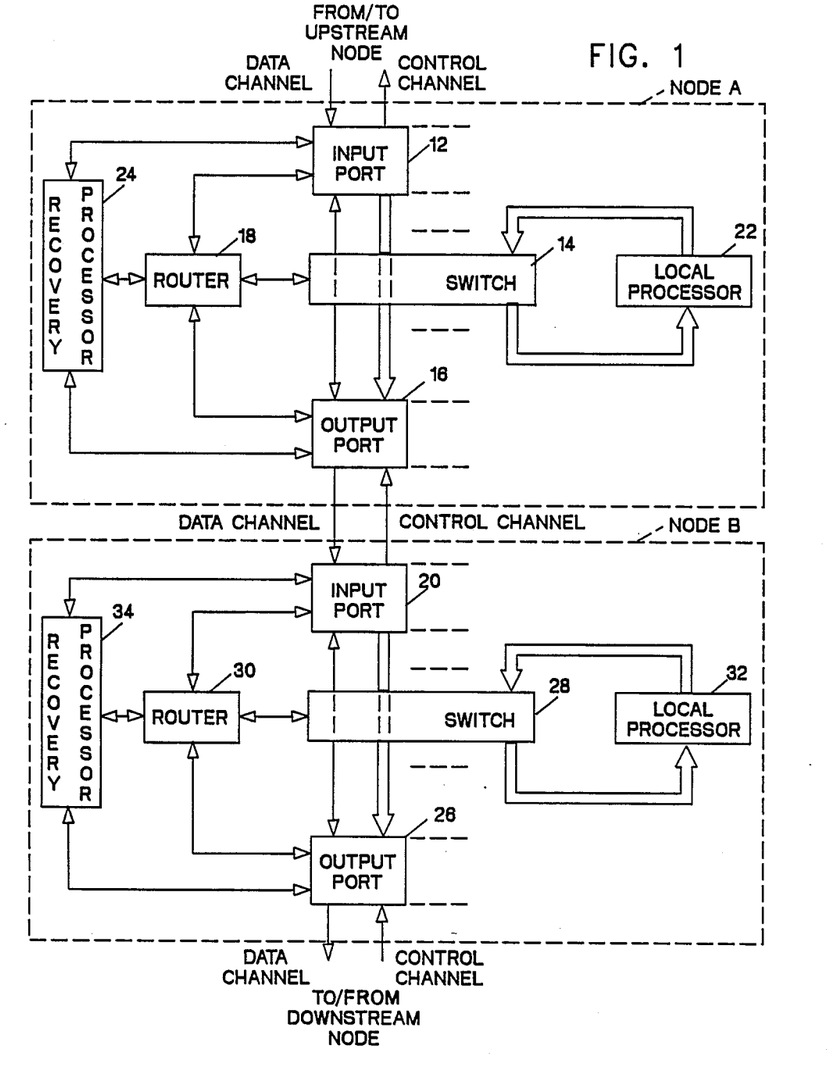
FIG. 1 shows a block diagram of two of a plurality of nodes included in a multiprocessor system.

Referring to FIG. 1, there is shown two nodes A and B of a plurality of nodes which are a part of a multiprocessor system. Node A includes a plurality of input ports 12 (one shown) which are selectively connected through a switch 14 to a plurality of output ports 16 (one shown) by a router circuit 18. One of the plurality of output ports 16 is coupled to one of a plurality of input ports 20 of node B by a data channel and a control channel. The data channel facilitates the transmission of data packets between various nodes in the system while the control channel is primarily used to acknowledge the reception of the data packets. Signals appearing on the data and the control channels are in the form of serial encoded binary data and clock information. A local processor 22 is coupled to an input and an output of the switch 14 in a parallel manner which enables the local processor to feed data packets to and receive data packets from the multiprocessor system, respectively. Node A also includes a recovery processor 24 having read and write access to all state information in the input port 12, the output port 16 and the router circuit 18. The recovery processor 24 is activated by one of the plurality of input ports 12 or one of the plurality of output ports 16 to perform error recovery and is not otherwise involved in error-free transmission of data packets. Moreover, node A is coupled to upstream and downstream nodes by a plurality of data channels and control channels which are associated with the respective input ports 12 and output ports 16.

Node B, which is similar to node A, includes the plurality of input ports 20 (one shown), a plurality of output ports 26 (one shown), a switch 28, a router circuit 30, a local processor 32 and a recovery processor 34. Moreover, node B is coupled to upstream and downstream nodes by a plurality of data channels and control channels which are associated with the respective input ports 20 and output ports 26.

Figure 2:
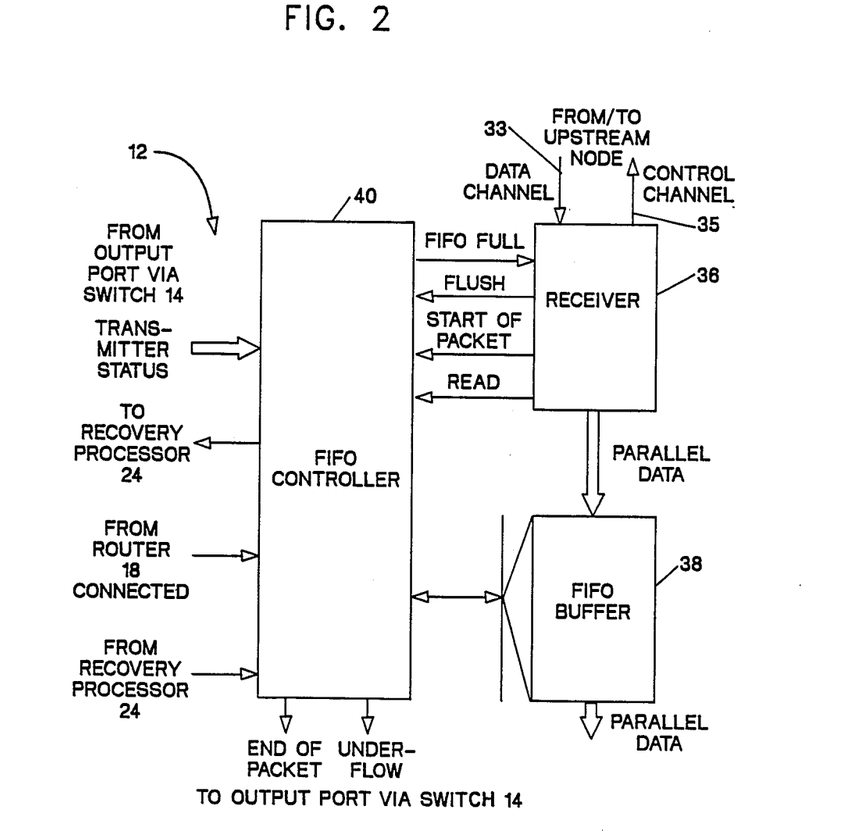
FIG. 2 is a detail schematic of an input port of a node of FIG. 1.

Referring to FIG. 2, there is shown a detailed block diagram of one of the plurality of input ports 12 and 20. The input ports 12 and 20 associated with nodes A and B, respectively, are identical circuits. Therefore, only input port 12 will be described in detail. A data channel 33 and a control channel 35 are coupled to a receiver 36. The receiver 36 accepts serial data from the data channel 33, converts the serial data to data in a parallel format and forwards the converted data to a first-in-first-out (FIFO) buffer 38. The receiver 36 also performs analysis on the incoming data packets and sends control information to (1) an output port associated with an upstream node over the control channel 35 and (2) a FIFO controller 40. The FIFO controller 40 and the FIFO buffer 38 facilitate the storage of incoming data packets and the forwarding of the packets through switch 14 to one of the plurality of output ports 16 selected by the router circuit 18. The selected one of the plurality of output ports 16 is coupled to one of the plurality of input ports 12 as result of a destination address which a part of a header which accompany every data packet.

Figure 3:
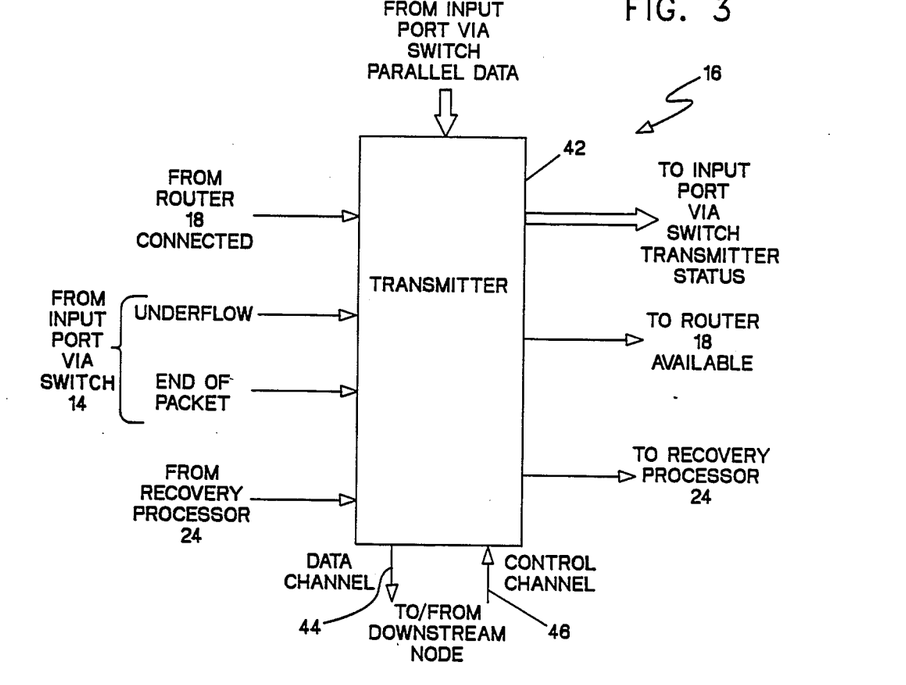
FIG. 3 is a detail schematic of an output port of a node of FIG. 1.

Referring to FIG. 3, there is shown a block diagram of one of the plurality of output ports 16 and 26. The output ports 16 and 26 associated with nodes A and B, respectively, are identical circuits. Therefore, only the output port 16 will be described in detail. A transmitter 42 is included in each one of the plurality of output ports 16. The transmitter 42 receives data in a parallel format from one of the plurality of input ports 12 coupled thereto through the switch 14. Transmitter 42 then converts the data to a serial format and forwards the converted data to a downstream node over a data channel 44. Transmitter 42 also receives acknowledgment information in a serial form on control channel 46 from the downstream node. The transmitter 42 and the FIFO controller 40 follow a rigorous handshaking procedure during the transmission of a data packet to insure the proper packet transmission. This handshaking procedure is a part of a data link protocol which controls the transmission of data packets within the multiprocessor system.

Figure 4:
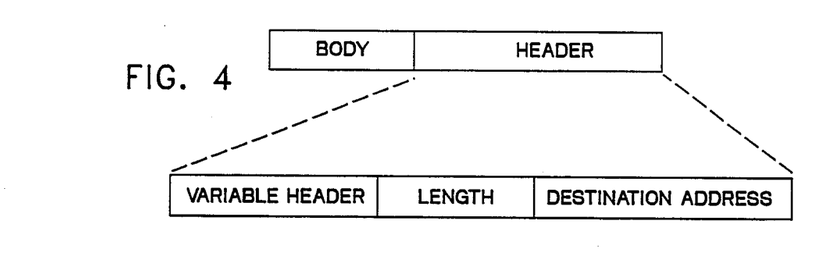
FIG. 4 shows a format associated with a data packet which is transmitted within the multiprocessor system.

Referring to FIG. 4, there is shown a format associated with each data packet transmitted within the switching system. Each data packet is preceded by a header which includes the following fields: (1) a destination address which the router circuits 18 and 30 use in coupling the proper output ports 14 and 26 to input ports 12 and 20, respectively, sending the data packet; (2) the length of the data packet in bytes; (3) a variable header which allows for various applications to be performed by the switching system; and (4) the body of the packet which is the data portion of the packet.

Figure 5:
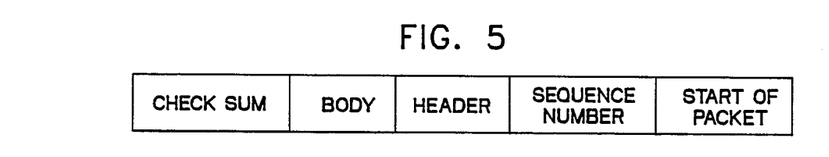
FIG. 5 shows a format of a sequence of fields which are transmitted with each data packet transmitted within the multiprocessor system.

Referring to FIG. 5, there is shown a format of a data packet which will be transmitted from a first node to a second or subsequent node. This format includes, in addition to all of the fields shown in FIG. 4, three additional fields to support a sliding-window protocol and error detection schemes. The additional fields are: (1) start of packet which is a sequence of bits indicating the start of a data packet; (2) sequence number is a plurality of bits which redundantly code a logical zero or a logical one in order to prevent duplicate packets from entering the multiprocessor system; and (3) a checksum field which facilitates the detection of errors in the transmitted data packet.

Figure 6:
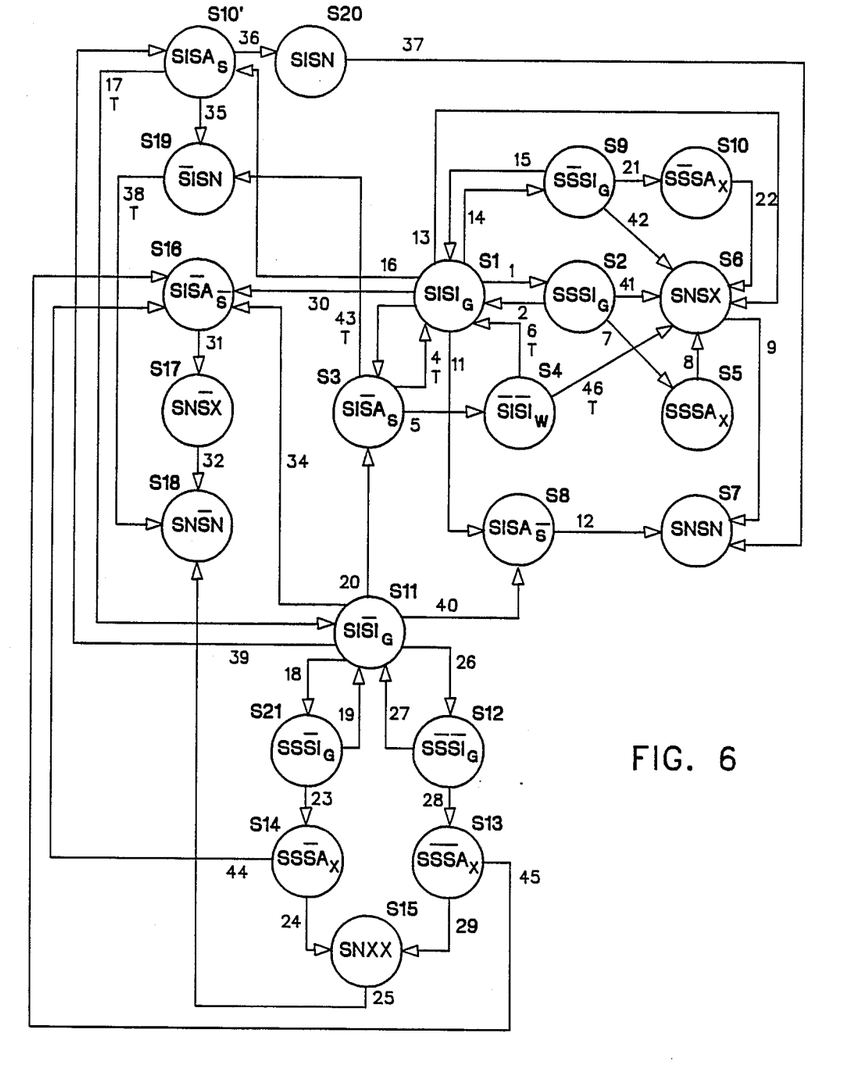
FIGS. 6, 7 and 8 show a state diagram of a data link protocol for transmitting data packets within the multiprocessor system.

Referring to FIG. 6, there is shown a state diagram of the data link protocol used in transmitting data packets within the multiprocessor system. Referring also to FIGS. 1, 2 and 3, for purposed of illustration, let us assume the FIFO buffer associated with node A has a data packet that must be forwarded to the FIFO buffer associated with node B. The goal of the data link protocol is to successfully transfer the data packet. Moreover, in order to simplify the understanding of the state diagram shown in FIG. 6, the following is a list of symbols and acronyms used throughout the analysis of the protocol.

| Hardware: | |
|---|---|
| A | Node A, the transmitting node. |
| B | Node B, the receiving node. |
| $IP_n$ | Input port n wherein n is defined as A or B. |
| $OP_n$ | Output port n wherein n is defined as A or B. |
| D | Data channel from $OP_A$ to $IP_B$. |

-continued

| | |
|---|---|
| C | Control channel from IP$_B$ to OP$_A$. |
| R$_n$ | The receiver in IP$_n$. |
| T$_n$ | The transmitter in OP$_n$. |
| FIFO$_n$ | FIFO buffer in IP$_n$. |
| FIFOC$_n$ | FIFO controller in IP$_n$. |
| RP$_n$ | The recovery processor at node n. |
| Channel states: | |
| I | The data channel idle pattern which is a particular sequence of bits indicating that the data channel is in the idle state. |
| I$_G$ | The control channel idle-go pattern indicating that IP$_B$ is able to accept a transmitted data packet. |
| I$_W$ | The control channel idle-wait pattern indicating that IP$_B$ is presently unable to accept transmission of a data packet. |
| S | The data packet labeled with sequence number S wherein S is encoded to represent a logical one or a logical zero. |
| S' | The data packet with sequence number S' or $\overline{S}$ wherein S is the logical complement of the current value of S. |
| X | Don't care, i.e. any permissible value is acceptable. |
| A$_S$ | Acknowledgment packet sent by the receiver indicating that the data packet with sequence number S was received correctly. |
| A$_{\overline{S}}$ | Acknowledgment packet sent by the receiver indicating that the data packet with the sequence number $\overline{S}$ was received correctly. |
| A$_X$ | Either acknowledgment packet. |
| Q | RP-to-RP packet which may be transmitted on either D or C. |
| G | No valid data on a channel. |
| G$_S$ | Erroneous data on channel that is mistaken for a start-of-packet sequence. |
| N | A no-clock state of the data or control channels which is characterized by a complete loss of signal information on the given channel. |
| Relevant data packet fields: | |
| L | The contents of the length field of a data packet. |
| SOP | Start-of-packet sequence which distinguishes a data packet or acknowledgment packet from I or I$_G$, respectively. |

The states in the state diagram are labeled by Sn where n is an integer and the transitions between states are labeled by integers only. Moreover, the sequence number variable S is used in the state diagram to avoid the need to enumerate conditions where S represents a logical zero and where S represents a logical one. Additionally, there are, as a result, cycles in the state diagram where the logical value of S must toggle. The transitions where S must be toggled are labeled with the letter T.

Referring to FIGS. 1, 2, 3 and 6, the packet switching system begins in state S1 which is a ready/waiting state. T$_A$ is transmitting I on D, receiving I$_G$ and C and is prepared to transmit a data packet from FIFO$_A$ as data packet S. T$_A$ indicates the intended transfer by asserting an Available signal to the router circuit 18. In a similar manner, R$_B$ is receiving I on D, transmitting I$_G$ on C and is ready to accept packet S from T$_A$. Transmission of packet S begins with transition 1 from state S1 to state S2. The router circuit 18 connects FIFO$_A$ through switch 14 to T$_A$ and asserts a Connected signal to both the FIFOC$_A$ and T$_A$ indicating that a connection exists therebetween. T$_A$ then de-asserts the Available signal which informs the router circuit 18 that OP$_A$ is busy with packet transmission. T$_A$ also places a SOP sequence and the sequence number S on D and asserts a Send signal on the Transmitter status lines. The Send signal instructs the FIFOC$_A$ parallel format, through switch 14. T$_A$ then converts the bytes of the data packet to a serial format, encodes the data packet and transmits the data packet on D. During the forwarding of the data packet by FIFO$_A$, T$_A$ continuously monitors whether an Underflow signal is asserted by FIFOC$_A$. The assertion of the Underflow signal indicates that an error in the transmission of the data packet has occurred. When the Underflow signal is asserted by FIFOC$_A$, the protocol takes transition 41 from state S2 to state S6. T$_A$ then stops the clock on D and takes transition 9 to an error state S7. R$_B$ responds by removing the clock from C.

If the Underflow signal was not asserted, upon receiving SOP on D, R$_B$ decodes the first incoming byte of data, converts it to a parallel format and forwards the converted data to FIFOC$_B$ by asserting the StartOfPacket and Read strobe signals. Subsequent packet bytes are similarly decoded, converted to parallel format and strobed to FIFOC$_B$. R$_B$ also extracts the sequence number S and the packet length L from the packet header. As the data packet is received, R$_B$ counts down from L, checksums the data packet and verifies that the sequence number S was the one expected. When L equals zero, the last byte of the data packet has been received from T$_A$ and transition 2 is taken. R$_B$ determines whether the checksum for the data packet is correct, strobes the Read line and forwards the last byte of data to FIFOC$_B$. FIFOC$_B$ has then received the entire data packet without error.

Simultaneously, when FIFOC$_A$ reaches the end of the data packet, it asserts the EndOfPacket signal. T$_A$, in response to the EndOfPacket signal, transmits the last byte of data, starts a WaitingForAcknowledgement timer, and asserts a Wait signal on the Transmitter status lines. This places FIFOC$_A$ in a wait or suspended state. In transition 3 to state S3, R$_B$ encodes, serializes and transmits acknowledgement A$_S$ to T$_A$. R$_B$ also toggles the value held in FIFOC$_B$ which represents the sequence number of the next-expected data packet.

Transition 4 is taken from state S3 when FIFO$_B$ has room to accommodate a maximum-length data packet and R$_B$ has placed I$_G$ on C. This restriction exists because once data transmission from IP$_A$ through switch 14 to OP$_A$ to the adjacent node B has commenced, it can not be stopped and then restarted. Thus, the data link protocol requires the FIFOC$_B$ to refuse to accept a new data packet, which potentially is of maximum permissible length, until sufficient room exists in FIFO$_B$. This refusal is represented by an idle-wait (I$_W$) pattern on the control channel. Additionally, transition 4 represents that T$_A$ has (1) received the acknowledgement before the WaitingForAcknowledgement timer expired, (2) verified that the acknowledgement received was for the data packet sent (positive acknowledgement) and then (3) asserted a Release signal on the Transmitter status lines. The asserting of the Release signal facilitates the relinquishing of the FIFOC$_A$ to do other work. Additionally, T$_A$, in response to the appearance of I$_G$ on C, then toggles the sequence number stored in FIFOC$_A$ in preparation for sending the next data packet, $\overline{S}$, and asserts the Available signal which informs the router circuit 18 that OP$_A$ is now available to transmit another data packet.

If, as noted above FIFOC$_B$ refuses to accept a new data packet, FIFOC$_B$ asserts a FIFOFull signal, then transition 5 is taken from state S3 to state S4. The FIFO- Full signal indicates that FIFO$_B$ has insufficient room therein to accommodate a maximum-length data packet. Subsequently, R$_B$ places I$_W$ on C. T$_A$, having first seen the correct acknowledgement, A$_S$, followed by I$_W$, asserts Release on the Transmitter status lines. This assertion by T$_A$ frees FIFO$_A$ and starts WaitingForI$_G$ timer. Additionally, T$_A$ leaves the Available signal unasserted because it is not ready to send another data packet. Transition 6 is taken from state S4 to state S1 when FIFO$_B$ has room for the maximum-length data packet and FIFOC$_B$ de-asserts the FIFOFull signal. In response to the absence of the FIFOFull signal, R$_B$ places I$_G$ on C and toggles the sequence number stored in FIFOC$_B$. If T$_A$ detects I$_G$ on C before the WaitingForI$_G$ timer expires, it will toggle the sequence number stored in FIFOC$_A$, assert the Available signal which informs the router circuit 18 that it is free to send another data packet.

As noted above, when R$_B$ receives the last byte of the data packet S, it checksums the packet in order to determine whether an error has occurred during the transmission thereof. If the checksum indicates that data packet S contained an error, transition 11 is taken from state S1 to state S8 wherein R$_B$ sends a negative acknowledgement, A$\overline{S}$, to T$_A$ on C. Thus, R$_B$ is indicating that data packet S was the last packet it received correctly and which T$_A$ interprets to mean data packet S, the data packet just transmitted, must not have been received correctly by R$_B$. R$_B$ then sends a Flush signal to FIFOC$_B$ which results in FIFOC$_B$ discarding any remnant of the data packet from FIFO$_B$. Additionally, if FIFOC$_B$ has already started forwarding the data packet to an output port in node B, it will assert an Underflow signal which enables the output port to terminate the transmission by forcing the data channel it drives into a N state. Transition 12 from state S8 to an error state S7 implies (1) T$_A$, upon receipt of a negative acknowledgement, always stops the clock on D irrespective of the state of C and (2) R$_B$, upon transmitting a negative acknowledgement, always stops the clock on C irrespective of the state of D.

Thus, in transition 12, R$_B$ stops the clock on C, signals RP$_B$ that an error has occurred and suspends operation. Similarly, T$_A$ stops the clock on D, informs RP$_A$ of the error, holds the Transmitter status lines in the Wait position and suspends operation. It should be noted that whenever the Transmitter status lines are in a Wait state, FIFOC$_A$ is held in a dormant state, with the data packet T$_A$ just attempted to transmit held in tact in FIFO$_A$. The retention of the data packet by the FO$_A$ allows RP$_A$ to request FIFO$_A$ to resend the data packet until it is transmitted correctly.

As stated above, during transition 2, T$_A$ started the WaitingForAcknowledgement timer. If because of some serious error at IP$_B$, the timer expires, transition 13 is taken from state S1 to state S6 wherein T$_A$ stops the clock on D, signals RP$_A$ that an error has occurred and suspends operation. T$_A$ then holds its Transmitter status lines in the Wait state thus suspending operation of FIFOC$_A$. R$_B$, if it is able to do so, will then transit to the error state S7 as a result of transition 9.

R$_B$ encodes and transmits to T$_A$ encoded acknowledgement information, I$_G$ and I$_W$ over C. As a result of the coding of I$_G$ and I$_W$, a control channel reception error at OP$_A$ may cause T$_A$ to believe I$_W$ is appearing on C when I$_G$ is presently on C. If this condition is left unattended, this would lead to channel deadlock with T$_A$ waiting forever for I$_G$ which R$_B$ believes it is transmitting. To avoid this potential deadlock, the data link protocol requires T$_A$ to start the WaitingForI$_G$ timer whenever I$_W$ is detected. Thus, if the WaitingForI$_G$ timer expires prior to the detection of I$_G$ on C by T$_A$, transition 46 will be taken from state S4 to state S6 wherein T$_A$ stops the clock on D, informs RP$_A$ of the error, holds the Transmitter status lines in the Wait state and suspends operation. R$_B$ will then take transition 9 to the error state S7.

In state S2, T$_A$ is transmitting data packet S to R$_B$. Before T$_A$ completes the transmission of the last byte of data of the packet S, an acknowledgement, A$_X$, is received on C which is indicated by transition 7 to state S5. The presence of A$_X$ on C is a result of (1) the length field L erroneously indicated a packet length which is shorter than the actual length of S, hence R$_B$ responded with A$_X$ before the actual end of the packet S has been encountered or (2) the control channel acknowledgement. In either case, the protocol requires T$_A$ to take transition 8 from state S5 to state S6 whenever an acknowledgement is received prior to the completion of transmission of the data packet. T$_A$ stops the clock on D and takes transition 9 to the error state S7 It should be noted that although the transmission of data on D has stopped in state S6, T$_A$ must continue to accept data from FIFO$_A$ until the EndOfPacket signal is asserted. In essence, once a transmitter has asserted the Send signal, the data link protocol does not allow for an abort process between FIFO$_A$ and T$_A$ across the switch.

R$_B$, which detects the loss of clock information on D, takes transition 9 from state S6 to the error state S7. In transition 9, assuming the packet checksum has failed, R$_B$ signals Flush to FIFOC$_B$, stops the clock on C, informs RP$_B$ of the error and suspends operation. FIFOC$_B$, in response to the Flush signal, facilitates the discarding of the data packet from FIFO$_B$. Additionally, if FIFOC$_B$ has already started forwarding the data packet to an output port in node B, it will assert the Underflow signal which enables the output port to terminate the transmission of the packet by forcing the data channel into the N state.

Prior to the transmission of a data packet, T$_A$ transmits to R$_B$ the SOP, the sequence number and a header. During the transmission of the sequence number, the data channel D corrupts the packet sequence number in such a way that it appears to be its logical complement, $\overline{S}$, transition 14 from state S1 to state S9. In state S9, R$_B$ determines that it has already received data packet $\overline{S}$, discards the data packet as it is received without forwarding the packet to FIFOC$_B$. R$_B$ then extracts the length field, L, from the packet only for the purposes of recognizing the end of the packet, transition 15, at which time it sends A$\overline{S}$ on C, transition 11 indicating that packet $\overline{S}$ was received correctly. T$_A$ interprets A$\overline{S}$ as a negative acknowledgment and takes transition 12 to the error state as described above.

Additionally, while in state S9, a mid-transmission acknowledgement may be received on C, transition 21 to state S10. Thereafter, T$_A$ takes transition 22 from state S10 to S6 which is similar to transition 8 from state S5 to state S6. R$_B$ then takes the transition 9 from state S6 to the error state S7.

In analyzing the state diagram shown in FIG. 6, the sequence of transitions 14, 15, 16, 17, 18, 19 and 20 may result in a loss of one or two packets. The likelihood of this particular sequence occurring is small in view of the fact that following two specific errors must occur sequentially: (1) the packet sequence number must be logically complemented in transition 14 and (2) acknowledgement $A_{\overline{S}}$ must be logically complemented to $A_S$ in transition 16. Briefly, in state S10', $T_A$ incorrectly believes the packet S has been properly received by $R_B$ and informs the FIFOC$_A$ to release the packet. Thus, the packet S is now lost. Toggling the logical meaning of S and S' as transition 17 is taken, $T_A$ then transmits the next packet in transitions 18 and 19. $R_B$, however, discards the packet as it is received because sequence number of the packet is the logical complement of the sequence number expected. $R_B$ subsequently sends $A_S$ to $T_A$ in transaction 20 which falsely indicates that it has received the packet correctly. $T_A$ interprets $A_S$ to mean the packet just transmitted was received correctly. Hence, two packets are lost. As noted above, the probability of two sequential errors occurring is extremely small.

It is possible for a FIFO buffer to run out of data to present to an output port while in the process of transmitting a packet as a result of a failed checksum or a mid-transmission acknowledgement as noted above. Assume that FIFOC$_A$ runs out of data to present to OP$_A$ because R$_A$ has detected a transmission error and has asserted the Flush signal. FIFOC$_A$ then asserts the Underflow signal. $T_A$, in response to the Underflow signal, take transition 41 from state S2 or transition 42 from state S9 as stated above. In either case, $T_A$ will stop the clock on D, assert Release on the Transmitter status lines, inform RP$_A$ of the error and suspend operation. R$_B$ will take transition 9 to state S7 in a manner which is similar to that discussed above in response to a the mid-transmission acknowledgement. In order to recover, RP$_A$ must instruct $T_A$ to send a new packet with the same sequence number as the packet which underflowed. RP$_A$ will readily determine this fact when it detects that the Underflow signal is asserted in $T_A$'s state information. This procedure assures that OP$_A$ and IP$_B$ will not lose synchronism with respect to packet sequence numbers. Retransmission of the failed packet will proceed from the node where the packet was last buffered in its entirety. Referring to state S11, transition sequences 18, 23, 44 and 26, 28, 45 are analogous to transition sequences 1, 41, 9 and 14, 42, 9, respectively.

Figure 7:
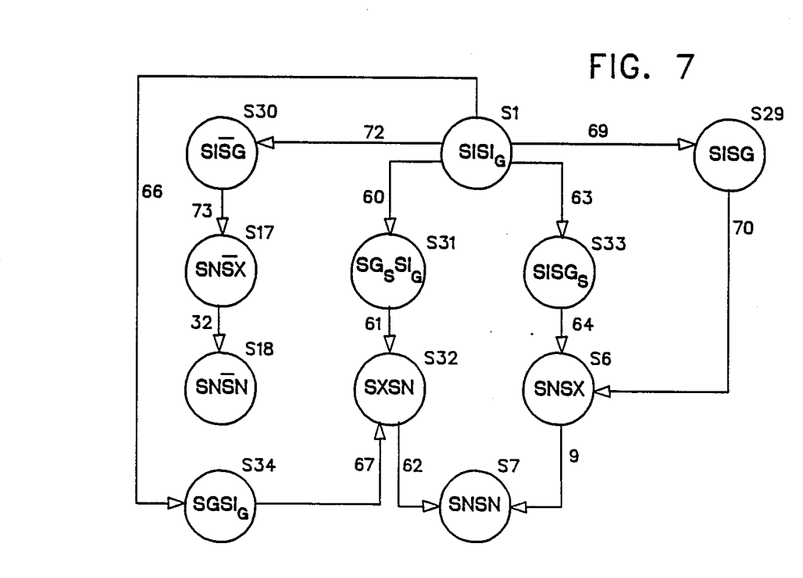

Referring to FIG. 7, there is shown a state diagram which sets forth the transitions and states associated with error in sequence number, invalid data on the channels, false SOP and acknowledgment errors. An error in a sequence number is defined to be any corruption of the sequence number field other than logical complement which was discussed above as a wrong sequence number. The transition sequence begins in state S1 which is the main ready/waiting state. The sequences described hereafter could also occur while the protocol is in state S11 another ready/waiting state. However, in view of the similarity between state S1 and state S11, only references to state S1 will be made. In transition 66, all of the events described for transition 1 in the normal packet transmission occur up to the extraction of the sequence number S by R$_B$. At this point, either R$_B$ is able to extract S from the packet but detects an error in the field or R$_B$ is totally unable to decipher what is detected on D. This condition is symbolized by G in the forward channel state in state S34. In either case, R$_B$ stops the clock on C, informs RP$_B$ of the error and suspends operation by taking transition 67 to state S32. Upon detecting loss of clock on C, $T_A$ stops the clock on D but must continue accepting data from FIFOA until the EndOfPacket signal is asserted. $T_A$ thereafter an error has occurred and suspends operation by taking transition 62 to state S7.

Referring again to state S1, while $T_A$ is waiting for an acknowledgement, R$_B$ determines that the packet was received without error and sends a positive acknowledgement to $T_A$ which is corrupted on C (transition 72). Thereafter, I$_A$ will either be able to extract the acknowledgment from C and detect an error in the packet or it will be completely unable to decipher what it saw on C. $T_A$ will immediately stop the clock on D, hold the Transmitter status lines in the Wait state, inform RP$_A$ of the error and suspend operation by taking transition 73 to state S17. R$_B$ then takes transition 32 to state S18 by stopping the clock on C, informing RP$_B$ of the error and suspending operation. It should be noted that following recovery, $T_A$ and R$_B$ will be out of synchronism with respect to S. However, the protocol will resolve this problem after one successful resending of the packet.

Additionally, while $T_A$ is waiting for an acknowledgment in state S1, R$_B$ detects an error in the packet as a result of a checksum failure. R$_B$ then sends a negative acknowledgment to $T_A$ which is corrupted on C (transition 69). Similar action will occur in transition 70 as which occurred in transition 73. Transition 9 is then taken to the error state S7. In this case, synchronism between $T_A$ and R$_B$ is retained and the protocol will recover on the next transmission of the packet.

While in state S1, R$_B$ is ready to receive a new packet, a noise burst strikes D such that what appears to be a valid SOP sequence and sequence number S are present on D. R$_B$, will begin to receive what it believes to be a valid packet. The checksum should indicate an error in this packet upon which, in transition 61, R$_B$ sends a negative acknowledgment to $T_A$, stops the clock on C, notifies RP$_B$ and suspends operation. $T_A$ then takes transition 62 to the error state S7. If at this time $T_A$ actually had been sending a real packet on D, it must continue accepting data from FIFOC$_A$ until the EndOfPacket signal is asserted. Recovery will proceed after the assertion of the EndOfPacket signal.

In a similar manner while waiting for an acknowledgment in state S1, noise corrupts the idle pattern on C in such a way that it appears to $T_A$ that R$_B$ is sending an acknowledgment packet (transition 63). R$_B$ will extract the data packet from D. $T_A$ upon detecting an error in the acknowledgement or in time between the packet and what is expected to be I$_W$ or I$_G$ takes transition 64 to state S6 wherein $T_A$ stops the clock on D. R$_B$ responds in taking transition 9 to the error state S7 wherein the clock on C is removed.

Figure 8:
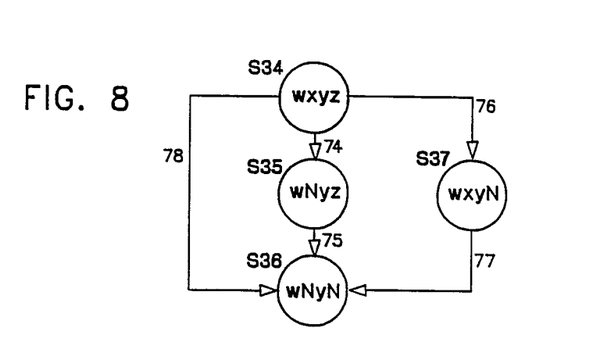

Referring to FIG. 8, shown therein is a state diagram which represents the protocol behavior when invalid data is detected on a channel or failure of an analog channel or port occurs. These events may occur at any time and as such are represented by the use of state variables w, x, y and z which are defined as:

w: The data packet the transmitter will send or is sending on the data channel wherein w represents S, $\overline{S}$ or Q.

x: The state or contents of the data channel wherein x represents I, Q, S, $\overline{S}$, N, G or G$_S$.

y: The packet the receiver expects to receive or is receiving on the data channel wherein y represents S, $\overline{S}$ or Q.

z: The state or contents of the control channel wherein z represents $A_{\overline{S}}$, A$_S$, I$_G$, I$_W$, Q, N, G, or G$_S$.

If $T_A$ is unable to determine the binary value of an encoded symbol or value taken from C, it takes transition 74 to state S35 and stops the clock on D. $T_A$ thereafter informs $RP_A$ of an error and suspends operation. However, for example, if $T_A$ is in the process of transmitting a packet S to $R_B$ and an invalid data symbol is detected on C, $T_A$ must continue accepting data from $FIFOC_A$ until the EndOfPacket signal is asserted. Thereafter, $T_A$ informs $RP_A$ of the error, takes transition 75 to state S36 and suspends operation. The recovery process at nodes A and B will be determined by the states of $OP_A$ and $IP_A$ when the error was detected.

Similarly, if $R_B$ is unable to determine the binary value of a data symbol detected on D, it takes transition 76 to state S37 and stops the clock on C. Certain actions may have to be performed before $R_B$ informs $RP_B$ of an error and suspends operation. Using the example immediately above, $R_B$ would have to first assert Flush, hereby ensuring that $FIFOC_B$ discards any traces of the packet received so far before signalling $RP_B$ and halting operation by taking transition 77 to state S36.

Failure of any analog component along D, such as the physical channel itself, will result in complete loss of clock and data information on the channel. The sequence of transitions 74 and 75 represents a failure of the data channel and the subsequent transition to the error state. Similarly, failure of any analog component along C will result in complete loss of signal information on the channel. Sequence of transitions 76 and 77 represents this failure. Transition 78 from state S34 to error state S36 represents the events that take place when both channels D and C fail simultaneously. This type of failure may result if D and C were simultaneously disconnected or severed.

Figures 9, 9A:
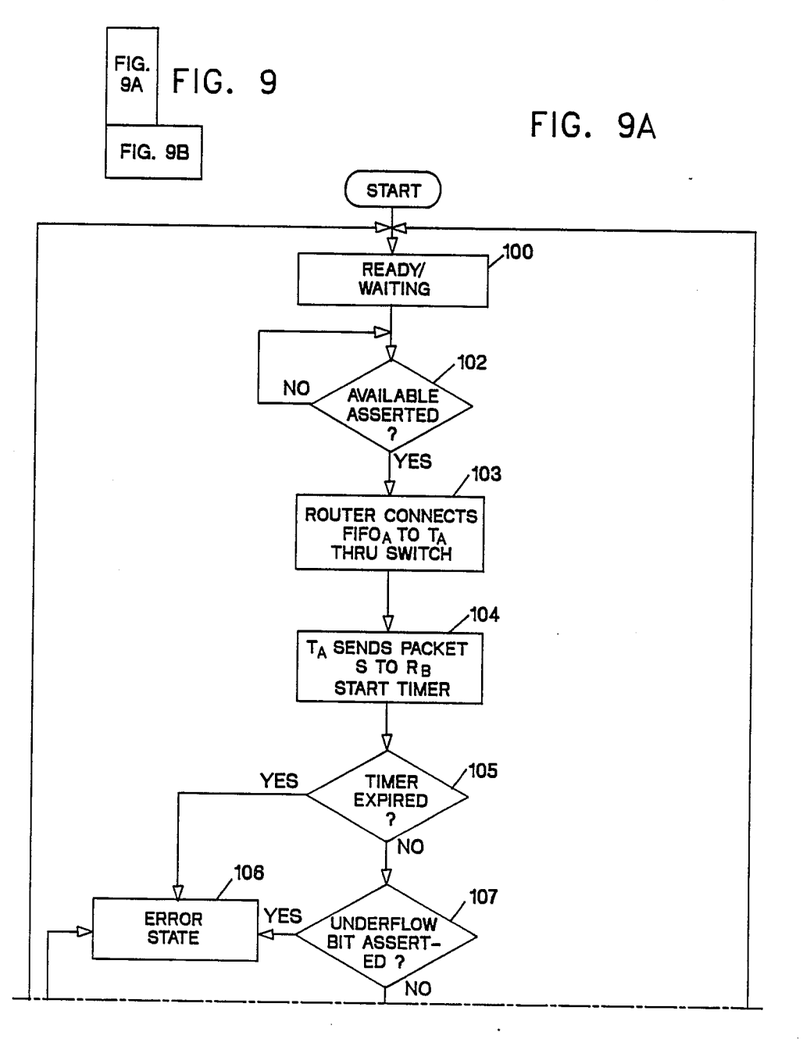
FIGS. 9a, 9b, 10a and 10b show flow diagrams of the data link protocol for transmitting data packets within the multiprocessor system.
Figure 9B:
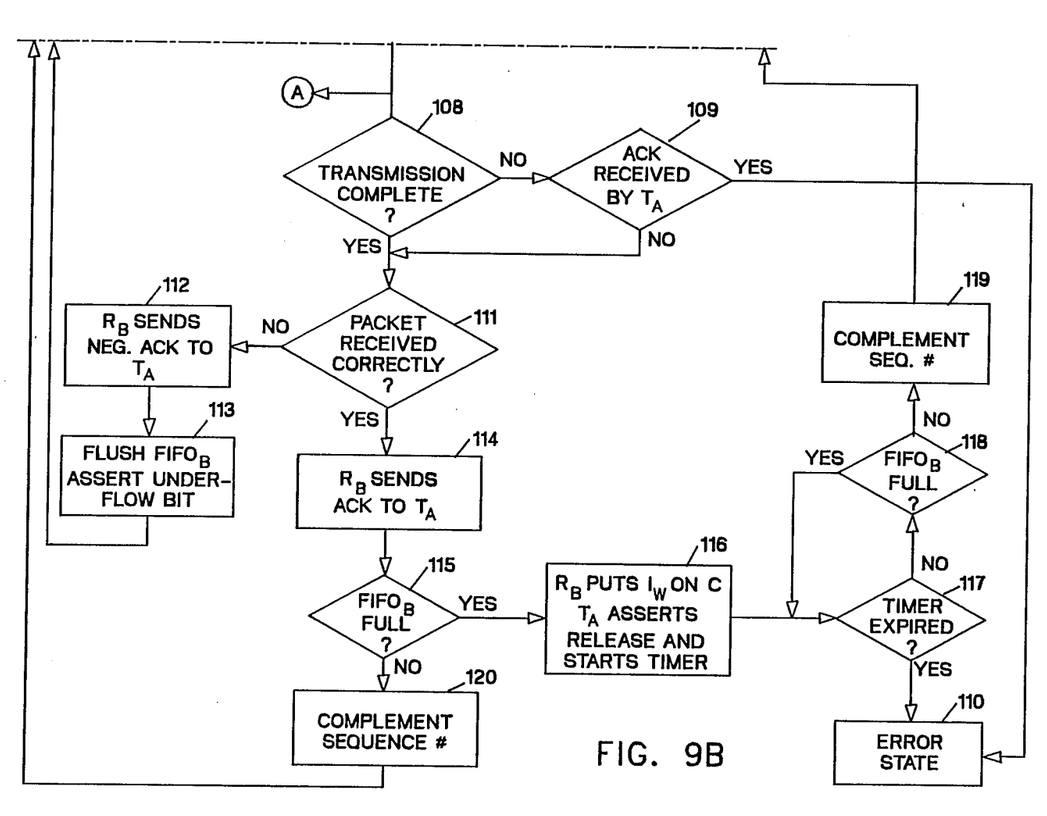

Referring to FIGS. 9a and 9b there is shown a flow diagram of the steps of the protocol involved in transmitting a data packet from node A to node B. Referring also to FIGS. 1, 2 and 3, the protocol starts in a ready/waiting step 100 which is equivalent to state S1 shown in FIG. 6. Step 102 determines whether $T_A$ has asserted the Available signal to the router circuit 18 indicating that it is ready to transmit the data packet. Router circuit 18, in response to the assertion of the Available signal, facilitates the connection of $T_A$ through switch 14 to $FIFO_A$ in step 103. $T_A$ then de-asserts the Available signal, places the SOP sequence and the sequence number S on D and transmits the data packet S to $R_B$ in step 104. Additionally, $T_A$ starts the WaitingForAcknowledgment timer and asserts Wait on the Transmitter status lines. In step 105, a determination is made whether $T_A$ received an acknowledgment sequence from $R_B$ prior to the expiration of the timer. If the timer has expired in step 105, the protocol enters an error state represented by step 106. Alternately, $T_A$ in step 107 determines whether the Underflow signal is asserted by $FIFOC_A$. In response to the assertion of the Underflow signal, the protocol moves into the error state step 106. In step 108, the protocol determines whether the transmission of the packet is complete. If an acknowledgment is received by $T_A$ prior to the completion of transmission of the packet, the protocol enters the error state by taking steps 109 and 110. Otherwise, $R_B$ determines in step 111 whether the data packet was received correctly. If there was an error in the transmission of the data packet, $R_B$, as set forth in steps 112, 113 and 106, sends a negative acknowledgment to $T_A$, flushes $FIFO_B$, asserts an Underflow signal if $FIFO_B$ is cut through, which facilitates the flushing of any downstream nodes and enters the error state, respectively. However, if the data packet was received correctly, $R_B$, in step 114, sends a positive acknowledgment to $T_A$ over the control channel C. $R_B$, in steps 115 and 116, places the $I_W$ sequence on C when FIFOB is full. $T_A$, in response thereto, asserts the Release signal and starts an $I_G$ timer. If the timer expires prior to the appearance of $I_G$ on C, $T_A$ in step 117 facilitates node A to enter the error state. If the timer in step 117 did not expire and space becomes available in FIFOB, $R_B$ then places $I_G$ on C and returns to the ready/waiting step 100.

Returning to step 115, if there was space in $FIFO_B$ for the entire data packet S, $R_B$ complements the sequence number and the protocol returns to the ready/waiting step 100.

As stated above, when the protocol enters the error state, a port or channel failure has occurred between nodes A and B. Thereafter, the respective recovery processors 24 and 34 can autonomously determine whether recovery from the failure is possible. For purposes of illustration, let us assume that $OP_A$ has entered the error state, $RP_A$ must then examine the state information of the port prior to determining the recovery sequence. $RP_A$ may determine that transitions 1, 2, 11 and 12, as shown in FIG. 6, has occurred and may simply want $T_A$ to re-transmit the data packet to $R_B$. Simultaneously, $RP_B$ attempts to recover the channel and may place node B in the ready/waiting state S1.

Figures 10, 10A:
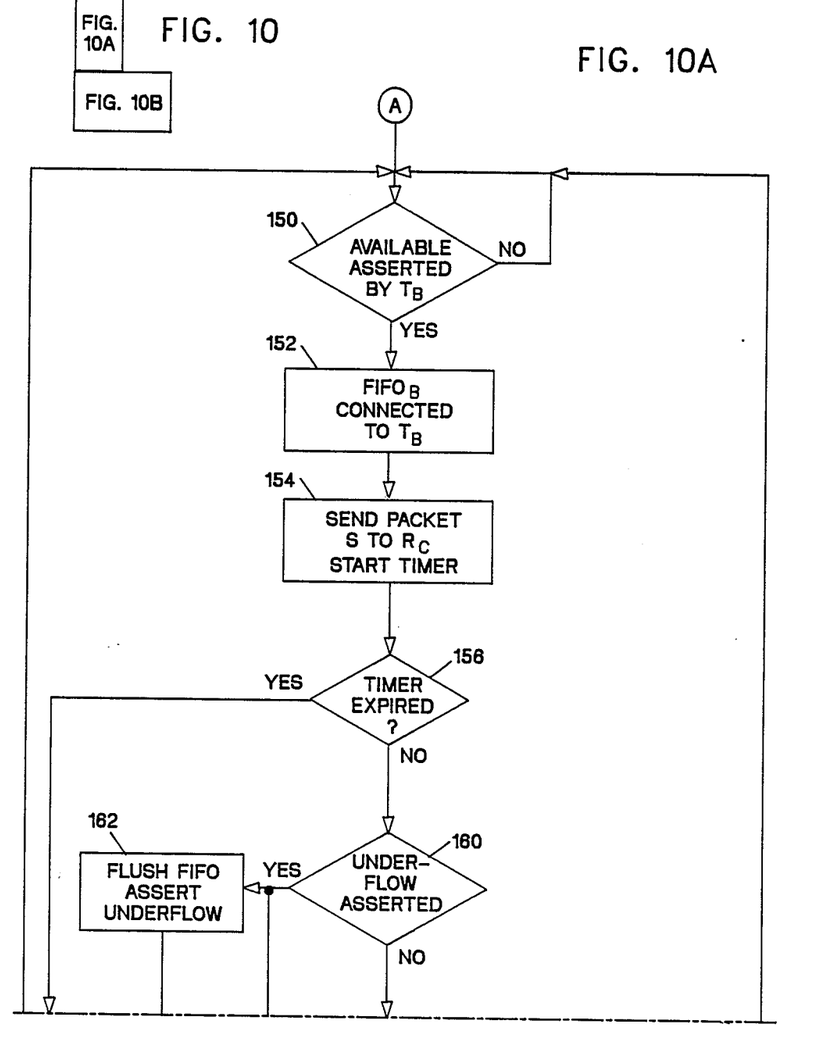
Figure 10B:
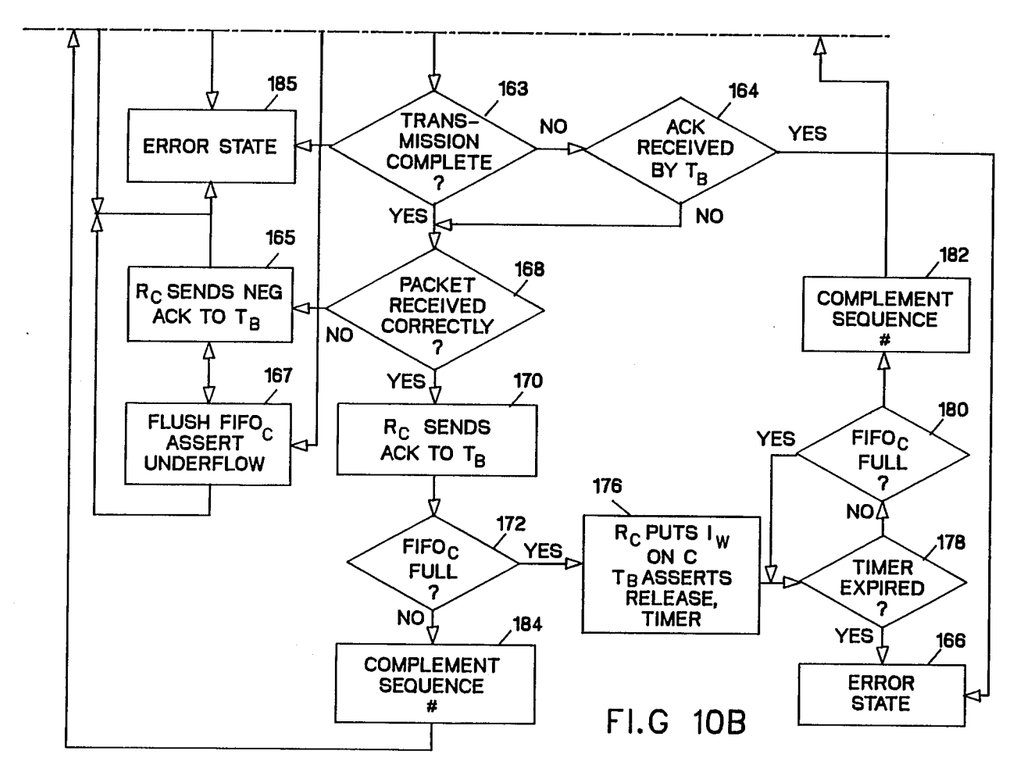

As further stated above, the protocol includes the steps wherein the data packet is transmitted from a first node to a protocol also facilitates the transmission of a data packet from a first node through intermediate node or nodes to a final node without storing the packet in the intermediate node or nodes. This process is called virtual cut-through. Referring to FIGS. 9b, 10a and 10b there is shown a flow diagram of the virtual cut-through process. For purposes of illustration, let us assume that a data packet is to be transmitted from node A through B to node C. Node C is identical to nodes A and B as shown in FIG. 1. Referring to FIGS. 9a and 9b, steps 100 through 107 are also used in the virtual cut-through process. When node B receives the header of the data packet S and determines that the packet is for node C, $T_B$ in step 150 asserts an Available signal to the router circuit 30 and $FIFOC_B$ then connects $FIFO_B$ to $T_B$. Thereafter, $T_B$ transmits the packet to $R_C$ and starts a WaitingForAcknowledgment timer in steps 152 and 154. The packet S is transmitted to $R_C$ without being stored in $FIFO_B$. If the timer expires prior to the receipt of an acknowledgment sequence from $R_C$, $T_B$ facilitates the entering of the error state in steps 156 and 178. However, if an underflow signal is asserted by $FIFOC_B$ in step 160, $FIFO_B$ is flushed in step 162 and FIFOC is flushed in step 167. From step 167, a negative acknowledgment is sent to $T_B$ in step 165 and the error state in step 185 is entered.

Returning to step 160, $T_B$ then determines in step 163 whether transmission of the data packet is complete and whether a premature acknowledgment was received in step 164. If a premature acknowledgment was received, the error state is entered in step 166, otherwise $R_C$ determines whether the data packet was received correctly in step 168. $R_C$ sends a positive acknowledgment to $T_B$ in step 170 if the packet was received correctly. The data packet is stored in $FIFO_C$ in step 172 and the sequence number is complemented in step 174. The protocol thereafter returns to the ready/waiting state.

If in step 172, $FIFO_C$ was full, $R_C$ places $I_W$ on C, $T_B$ asserts the Release signal and starts the $I_G$ timer in step 176. If space becomes available prior to the timer expiring, R_C ready/waiting state as set forth in steps 178, 180 and 182, respectively. Alternately, if the $I_G$ timer has expired prior to the appearance of $I_G$ on C, the protocol enters the error state.

Thus, the data packet was transmitted from node A through node B to its destination node C without storing the packet in the intermediate node B. This process can be used to transmit the data packet through any number of nodes to its destination node. It should be noted that if an Underflow signal is asserted by anyone of the intermediate nodes, the node asserting the signal and all downstream nodes flush their buffers and enter the error state. Re-transmission of the data packet will occur by the node where the data packet was last stored in its entirety.

While the invention has been particularly shown and described with reference to a preferred embodiment thereof, it will be understood by those skilled in the art that various changes in detail maybe made therein without departing from the spirit, scope and teaching of the invention. Accordingly, the data link protocol herein disclosed is to be considered merely as illustrative, and the invention is to be limited only as specified in the claims.

What is claimed:

1. A method for transmitting a data packet in an asynchronous digital network system having a plurality of nodes, comprising:
   (a) transmitting a packet of data from a transmitter of a first node to a receiver of a second node over a first data channel, and initiating a time delay at said first node;
   (b) analyzing said data packet for errors at said second node;
   (c) transmitting from said second node to said first node over a second data channel an ACK signal when said packet is determined to have no errors, and a NACK signal when said packet is determined to have errors;
      (i) storing each error free packet received at said second node in a FIFO buffer;
      (ii) detecting whether said FIFO buffer is full;
      (iii) signalling said first node when said FIFO is full;
      (iv) initiating a second time delay at said first node when said FIFO buffer is full; and,
      (v) asserting a signal on said second channel indicating to said first node that said second node is available to receive traffic if said FIFO buffer is not full before said second time delay expires;
   (d) initiating a retransmission of said packet of data from said first node transmitter to said second node if said ACK signal has not been determined to be present during said first time delay; and,
   (e) transmitting said packet from said second node to a further node when said packet has been received by said second node.

2. The method of claim 1 further comprising the step of flushing the contents of said FIFO buffer if an error is determined in a packet received by said second node.

3. The method of claim 1 further comprising the steps of retransmitting said packet to a subsequent node without storing said packet in said FIFO buffer when said packet is destined for said subsequent node.

* * * * *